United States Patent
Bower et al.

(12)

(10) Patent No.: US 6,247,471 B1
(45) Date of Patent: Jun. 19, 2001

(54) SMOKE HOOD WITH OXYGEN SUPPLY DEVICE AND METHOD OF USE

(75) Inventors: James W. Bower, Ilion, NY (US);
Timothy J. Hurley, Hardin, IL (US);
Lawrence B. Bosquet, Ilion, NY (US);
M. Russel Phinney, Maryville, IL (US)

(73) Assignee: Essex PB&R Corporation, Edwardsville, IL (US)

( * ) Notice: Subject to any disclaimer, the term of this patent is extended or adjusted under 35 U.S.C. 154(b) by 0 days.

(21) Appl. No.: 09/350,230

(22) Filed: Jul. 8, 1999

(51) Int. Cl.[7] ..................................................... A62B 7/00
(52) U.S. Cl. ............................. 128/205.21; 128/205.24; 128/201.25; 128/201.23; 128/205.27
(58) Field of Search ..................... 128/204.08, 202.26, 128/204.29, 204.28, 205.24, 202.22, 205.21, 205.27, 201.25, 201.23; 137/378, 495, 68.29, 68.3; 222/5

(56) References Cited

U.S. PATENT DOCUMENTS

| | | |
|---|---|---|
| 2,824,557 | 2/1958 | Mejean et al. . |
| 2,835,251 | 5/1958 | Oliveau . |
| 3,073,301 | 1/1963 | Hay et al. . |
| 3,103,927 | 9/1963 | Henneman et al. . |
| 3,185,148 | 5/1965 | Gaylord . |
| 3,326,231 | 6/1967 | Hogg . |
| 3,351,082 | 11/1967 | Gaylord . |
| 3,379,195 | 4/1968 | Bleach . |
| 3,762,407 | * 10/1973 | Shonerd ........................... 128/201.25 |
| 3,976,063 | 8/1976 | Henneman et al. . |
| 3,981,302 | 9/1976 | Veit . |
| 4,083,187 | * 4/1978 | Nagashima ............................. 60/407 |
| 4,221,216 | 9/1980 | Kranz . |
| 4,481,945 | 11/1984 | Levine . |
| 4,559,939 | 12/1985 | Levine et al. . |
| 4,609,166 | 9/1986 | Brennan . |

(List continued on next page.)

Primary Examiner—Aaron J. Lewis
Assistant Examiner—V. Srivastava
(74) Attorney, Agent, or Firm—Blackwell Sanders Peper Martin

(57) ABSTRACT

An emergency breathing device including a hood having use and storage configurations, which when compactly wrapped proximate to an oxygen control device for storage is recoverable for use. In use configuration, the hood is capable of being worn upon a user's head, which substantially surrounds the user's head. Hood surface beneath the user's head includes an opening lined with elastic material, which forms a seal about the user's neck at the opening when the hood is donned. An oxygen control device connected to a hood includes a valve body, an actuator, and an oxygen bottle. The valve body provides airflow communication with the interior of the hood, and the oxygen control device is connected to a plumbed breathable oxygen supply through a plumbed source disconnect means removably connected to the valve body. When connected, the oxygen control device permits airflow from the plumbed breathable oxygen supply and valve body to the interior of the hood. A cam within the valve body rotates with the operation of the actuator for engaging a piercing member to pierce the oxygen bottle, causing oxygen to flow from the oxygen bottle to the interior of the hood and forcing the plumbed source disconnect mechanism to simultaneously disconnect from the valve body. The user may therefore don the hood to receive breathable oxygen initially from the plumbed source and then from the oxygen bottle upon operation of the actuator and release from the plumbed source.

32 Claims, 16 Drawing Sheets

U.S. PATENT DOCUMENTS

| | | |
|---|---|---|
| 4,619,255 | 10/1986 | Spinosa et al. . |
| 4,625,721 | 12/1986 | Levine et al. . |
| 4,741,332 * | 5/1988 | Beaussant .................. 128/201.23 |
| 4,887,591 | 12/1989 | Okumura . |
| 4,889,113 * | 12/1989 | Pelloux-Gervais et al. .... 128/201.25 |
| 4,909,247 | 3/1990 | Terrisse et al. . |
| 5,027,810 * | 7/1991 | Patureau et al. ............. 128/206.24 |
| 5,078,343 | 1/1992 | Howlett . |
| 5,154,374 | 10/1992 | Beroth . |
| 5,301,665 | 4/1994 | Jumpertz et al. . |
| 5,524,616 * | 6/1996 | Smith et al. .................. 128/205.27 |
| 5,690,099 * | 11/1997 | Abramov et al. ............. 128/202.26 |
| 5,709,204 | 1/1998 | Lester . |
| 5,816,243 * | 10/1998 | Georgiou ..................... 128/205.24 |

\* cited by examiner

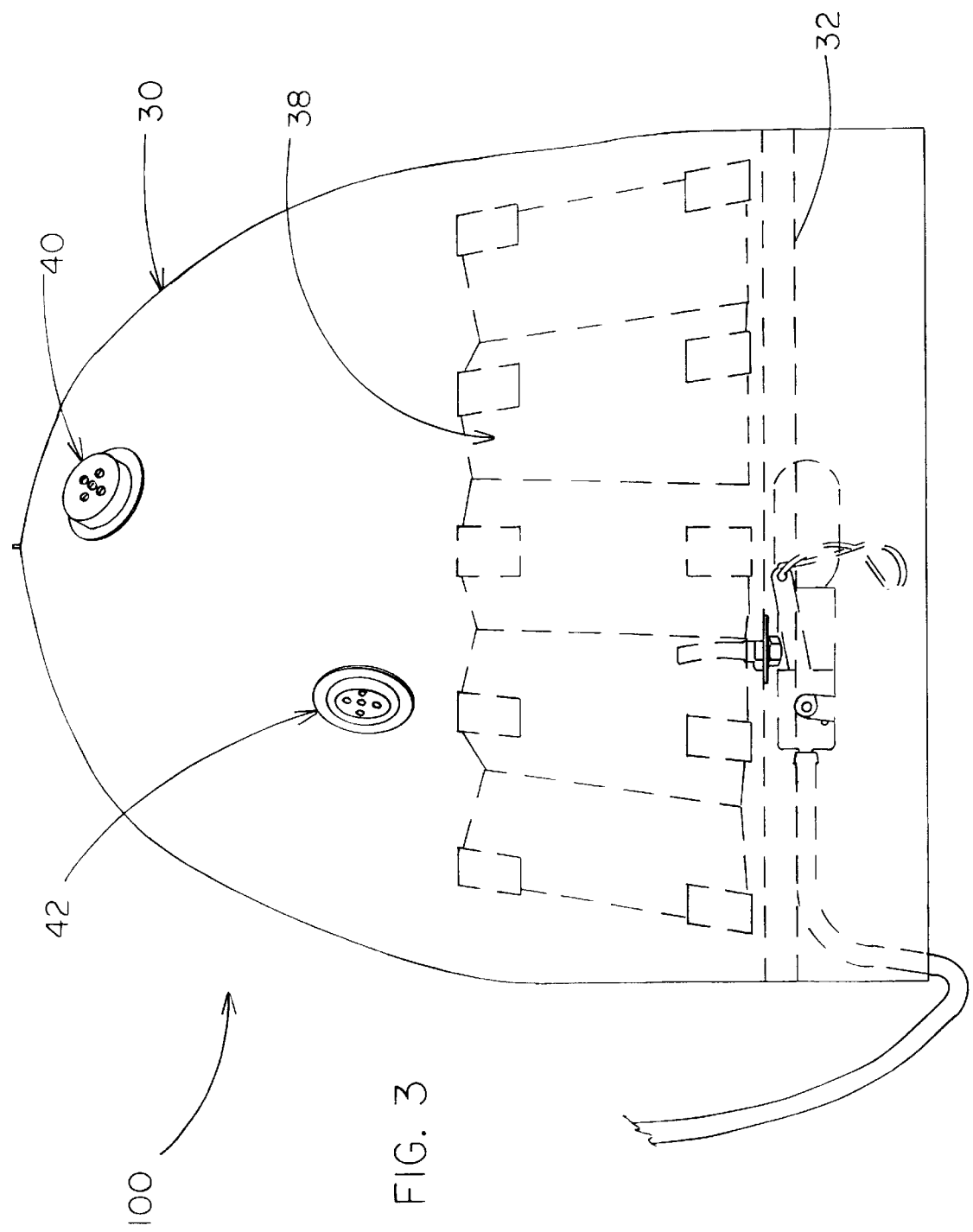

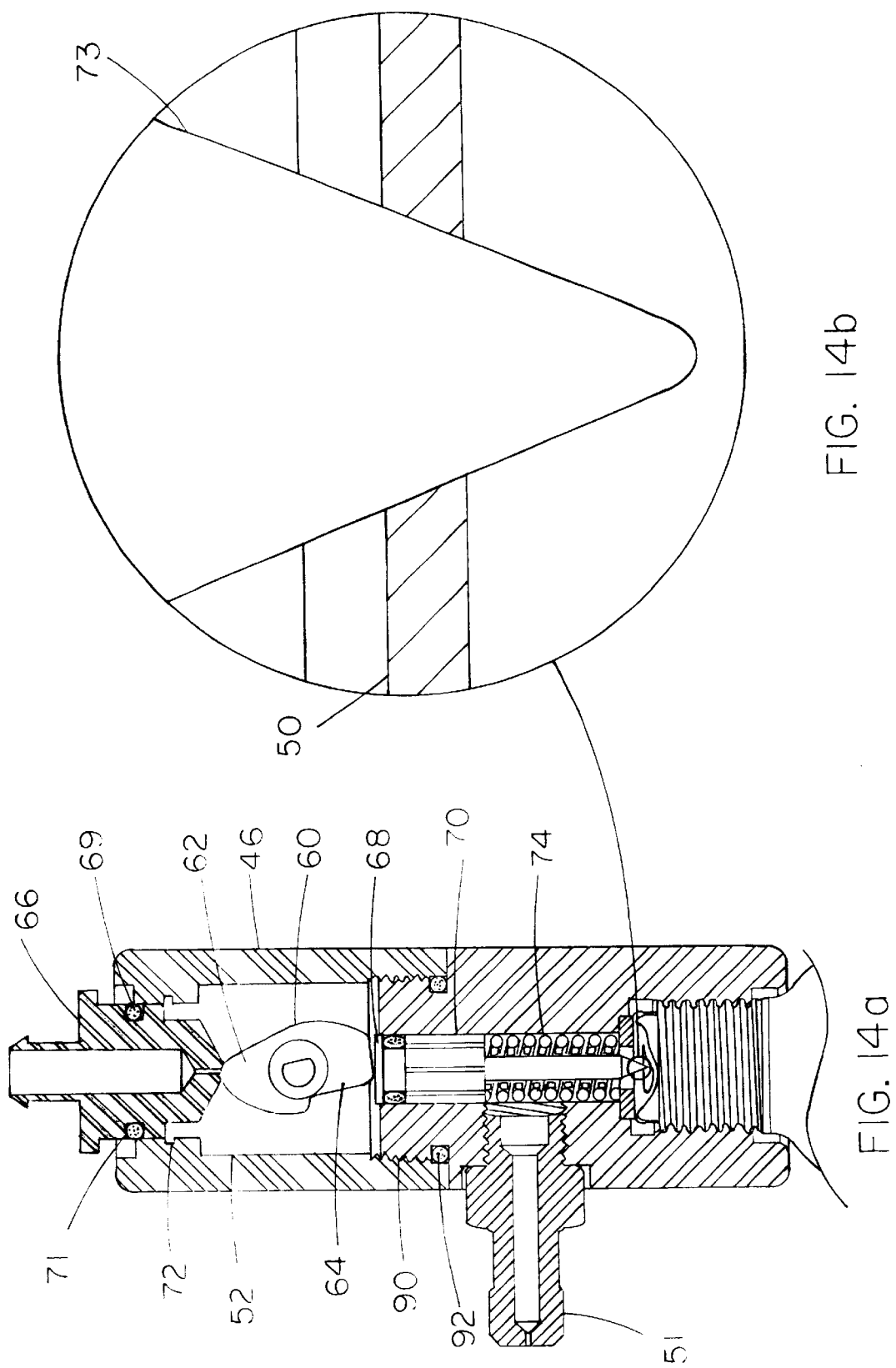

SMOKE HOOD WITH OXYGEN SUPPLY DEVICE AND METHOD OF USE

BACKGROUND

1. Field of Invention

The invention is in the field of smoke hoods which have a self-contained oxygen source, and more particularly, relates to a smoke hood that can receive oxygen from a plumbed source and which is switchable to a self-contained oxygen source, by virtue of a new oxygen valve developed for use in the hood.

2. Related Art

Oxygen supply devices are desirable for emergency situations, particularly by crew or passengers in aircraft. Various types of emergency oxygen supply devices are known in the art. A commonly known device consists of a cup-form mask, referred to as a "DIXIE" cup presumably for geometric similarity to a commercial cup so identified under this mark, attached to an oxygen supply tube fixedly connected to a plumbed source of oxygen, such as discussed in Jumpertz U.S. Pat. No. 5,301,665. Such attached devices are restraining, however, because they do not allow a user the freedom to pursue safety or escape. In a life-threatening emergency, it is critical for a user to have the ability to pursue freedom with a portable supply of breathable oxygen that shall last for at least a predetermined amount of time. Devices in the current art for the most part do not address this problem.

Oxygen supply devices in the related art that allow switching from a plumbed source to an independent source of oxygen require two or more distinct steps to switch the source of oxygen. Performing multiple steps in proper sequence, however, is cumbersome and potentially dangerous in a time-critical emergency situation.

Mask type emergency oxygen supply devices are also known in the art, such as Lester U.S. Pat. No. 5,709,204. They usually comprise a mask that covers a user's face, but they do not contain a portable oxygen source. These devices, therefore, typically do not allow two sources of oxygen with a switching mechanism between them. A user is therefore limited to the oxygen available from one oxygen source.

The related art devices have a further drawback of bulkiness. Space on military and civilian aircraft is precious and limited for permanent emergency supplies. On aircraft, especially, there is always a need for dependable emergency equipment comprising lesser volume. Because an emergency oxygen supply device is needed for each passenger, total volume reduction becomes significant when multiplied by the number of passengers.

SUMMARY OF THE INVENTION

It is in view of the above problems that the present invention was developed. This invention relates to an emergency breathing device for providing a user with breathable oxygen and protection before and during premises evacuation in an emergency. The device comprises a hood that has a use configuration and a storage configuration. The hood can be compactly wrapped with an oxygen control device for the storage configuration and is unwrappable for the use configuration.

The hood is capable of being worn upon the user's head when in use configuration. The hood is at least partially formed of collapsible, flexible material which is substantially airtight, and which in use configuration substantially surrounds a user's head continuously extending around and over the user's head while defining an interior breathing space about the user's head.

The hood also forms a surface beneath the head, including an opening lined with elastic material. The elastic material forms a seal about the user's neck at the opening when the user dons the hood through the opening.

The oxygen control device connected exteriorly of the hood includes a valve body, an actuator, and an oxygen bottle mated to the valve body which contains breathable oxygen. The valve body provides airflow communication with the interior breathing space of the hood, and can also be used to connect to a drop-down face mask.

A plumbed breathable oxygen supply means is connected to the oxygen control device through a plumbed source disconnect mechanism removably connected to the valve body. When connected, the plumbed source disconnect mechanism permits airflow from the plumbed breathing oxygen supply means and the valve body to the interior breathing space of the hood.

A piercing mechanism within the valve body causes airflow to commence from the oxygen bottle in response to operation of the actuator. A cam within the valve body rotates in response to operation of the actuator for engaging the piercing mechanism, causing oxygen to flow from the oxygen bottle to the interior breathing space of the hood, and forcing the plumbed source disconnect means to disconnect from the valve body.

Therefore, the user may don the hood in the use configuration to receive breathable oxygen initially from the plumbed source and then from the oxygen bottle upon operation of the actuator.

It may be appreciated that the various advantages of this invention include a compact storable device for emergency use. Another advantage is that the invention protects a user from smoke and chemicals that may be present in the ambient atmosphere during use. Yet another advantage is that the user is provided an initial supply of breathable oxygen from a plumbed source, and he can selectively switch to an auxiliary portable source of breathable oxygen in order to fully detach from the plumbed source and be free to pursue escape. Yet another advantage is that the switchover of breathable oxygen supply occurs simultaneously in one action, and has means to reasonably indicate a completed switchover.

Accordingly, in view of the above advantages and goals, the invention is, briefly, an emergency breathing device for providing a user with breathable oxygen and protection. The device has a hood disposed in premises proximate to an oxygen control device. The oxygen control device is connected exteriorly of the hood and includes a valve body, an actuator, and an oxygen bottle mated to the valve body. The valve body provides airflow communication with an interior of the hood. The oxygen control device of the invention is connected to a plumbed breathable oxygen supply through a plumbed source disconnect mechanism which is removably connected to the valve body, and which when connected permits airflow from the plumbed breathable oxygen supply and valve body to the interior of the hood. A piercing mechanism is positioned within the valve body for causing airflow to commence from the oxygen bottle in response to operation of the actuator. A cam within the valve body is rotatable in response to operation of the actuator. The cam is disposed to engage the piercing mechanism when rotated, thereby causing penetration of the bottle and permitting oxygen to flow from the oxygen bottle to the interior of the hood and forcing the plumbed source disconnect mechanism to disconnect from the valve body. The user may therefore don the hood to receive breathable oxygen initially from the plumbed source and thereafter from the oxygen bottle upon operation of the actuator, or from the oxygen bottle alone.

These and other above advantages and features of the invention will be in part apparent and in part pointed out hereinbelow.

BRIEF DESCRIPTION OF THE DRAWINGS

FIG. 3 depicts the device in a recovered state wherein it is inflated and has achieved its functional shape.

FIG. 12b is an elevational view of the device of FIG. 12a.

FIG. 13a is an enlarged elevational view of pierce pin shown in FIG. 12a.

FIG. 13b is an end elevational view of pierce pin of FIG. 13a.

FIG. 14a is a sectional view of the oxygen control device when the cam is in overtravel position during the switching operation.

FIG. 14b is an enlarged portion of FIG. 14a, showing the tip of the pierce pin penetrating the auxiliary oxygen source bottle.

Like parts are referenced with like reference numbers throughout the drawings for consistency.

DESCRIPTION OF PRACTICAL EMBODIMENTS

Figure 1:
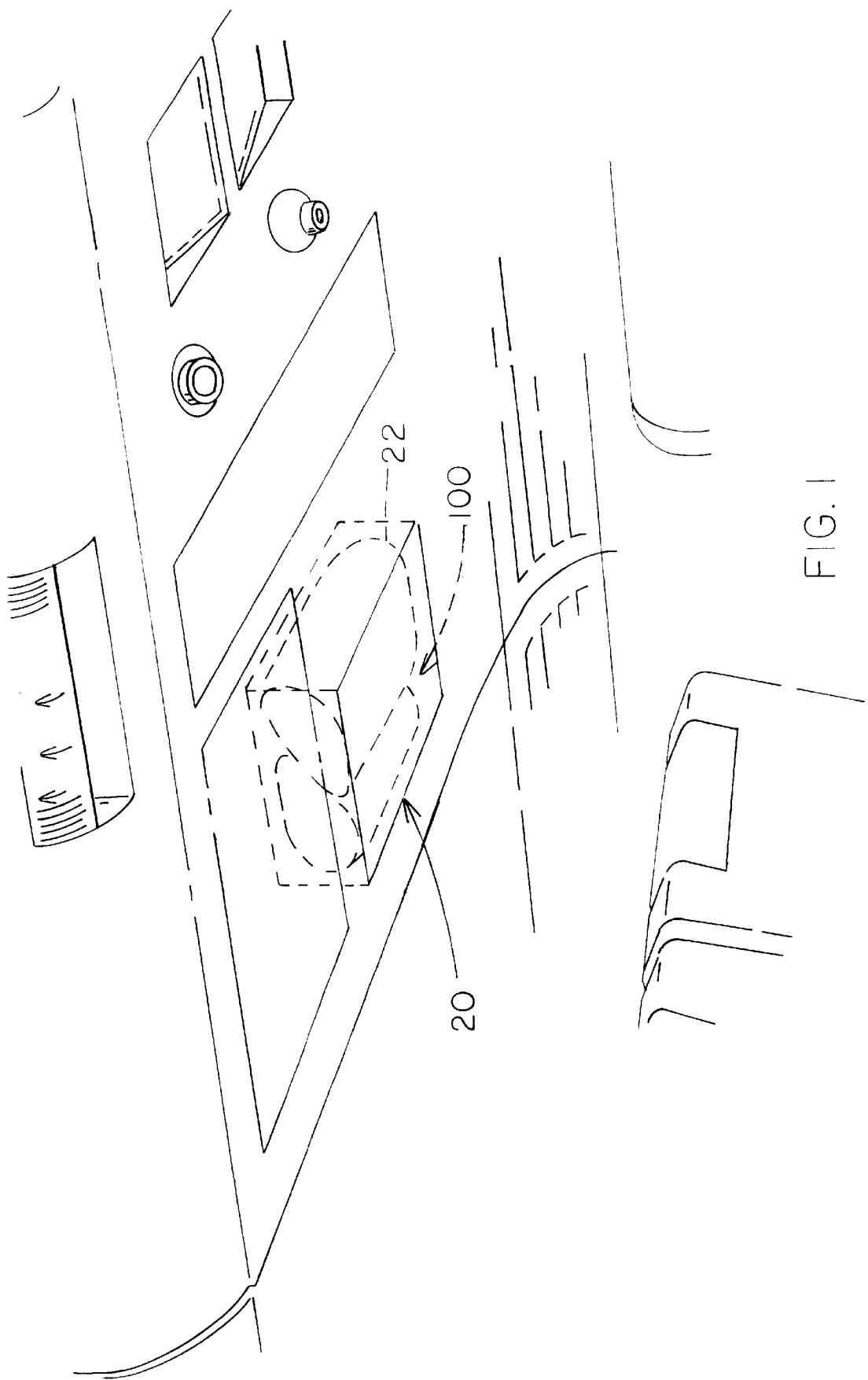
FIG. 1 depicts an oxygen supply device in accordance with the instant invention showing the device wrapped compactly and stored in a storage bin until needed in an emergency.

With reference to the drawings, and initially to FIG. 1, the new combined smoke hood and oxygen supply device, generally designated 100, is storable in a storage bin 20 while wrapped in a constraining wrapper 22. The wrapper and smoke hood portion are described initially herein and the details of the new oxygen supply mechanism are supplied thereafter.

Figure 2:
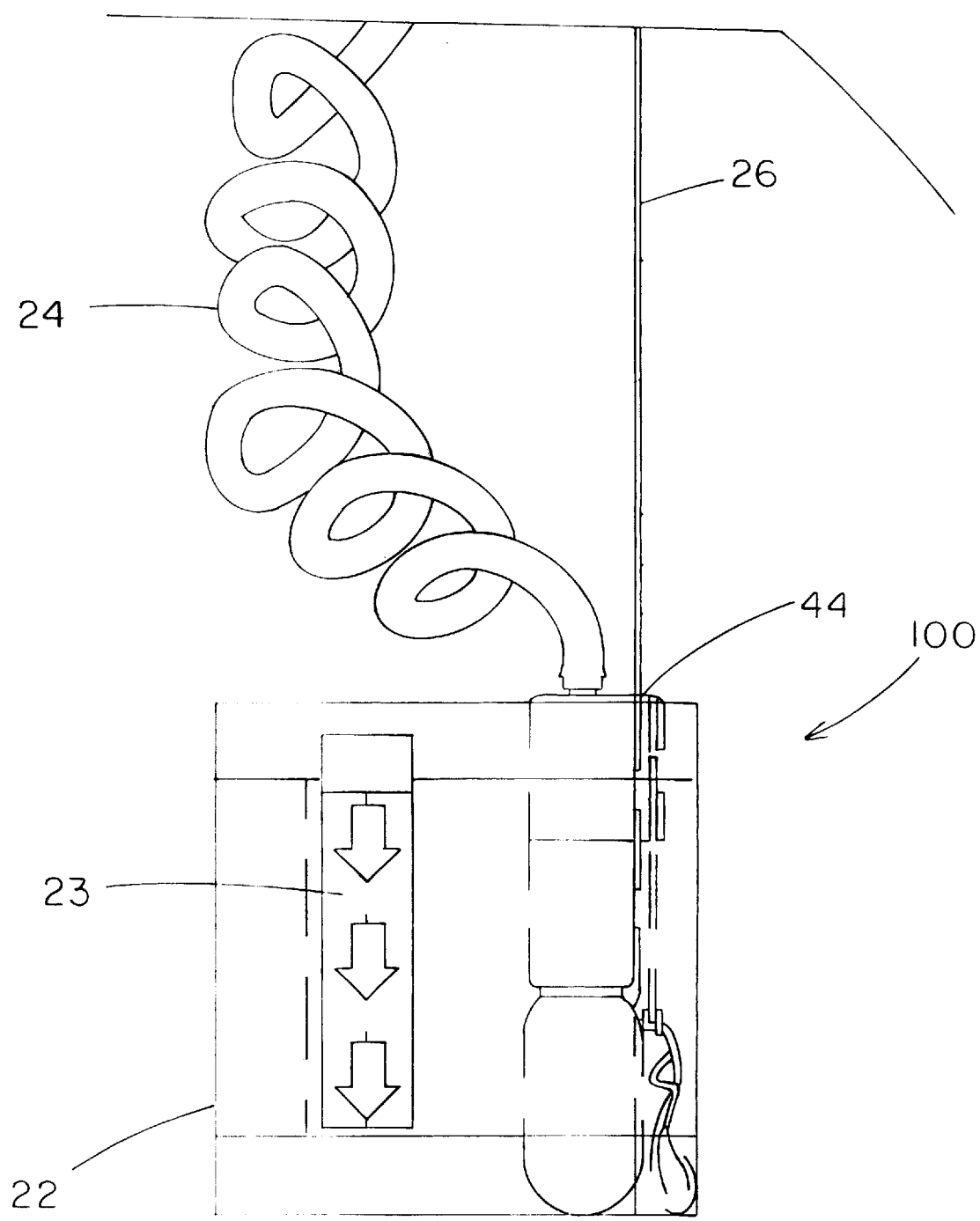
FIG. 2 depicts the wrapped device of FIG. 1 released from its storage bin but still connected thereto by virtue of an oxygen supply tube and a tether.

Constraining wrapper 22 and storage bin 20 are depicted in FIG. 1. Wrapper 22, as shown in FIG. 2, is a container such as a film or a bag with a pull-tab 23. Wrapper 22 may be made of polyethylene, polyester, or other tough, durable plastic film. Other configurations, such as a rubber sleeve, may also be used. Wrapper 22 is preferably tamper-evident, such that its opening or removal will indicate that device 100 may have been used and may require replacement.

In an emergency, storage bin 20 preferably opens automatically. However, a user can also manually selectively open the bin to expose device 100 within wrapper 22. Wrapped device 100 remains attached to storage bin 20 by an oxygen supply tube 24 and a tether 26 preferably connected to a pin (not shown) positioned in the plumbed oxygen supply. Supply tube 24 connects device 100 to a plumbed source of breathable oxygen, and tether 26 is an ordinary cord physically restraining wrapped device 100 within close proximity of storage bin 20.

To commence use, the wrapped device 100 is pulled toward the user, for example, by pulling on a tab such as that shown at 23. Force on tether 26, which restrains wrapped device 100 in storage bin 20, releases the pin (not shown) that is connected to device 100 from the plumbed oxygen supply. The minimum amount of force required to thus pull out tether 26 and the attached pin is preferably only about 10 lb. so as to be capable of release by a child, yet a release should occur only due to a deliberate intent of the user.

Pulling out tether 26 and thereby removing the pin in the plumbed oxygen supply that is connected to tether 26 results in breathable oxygen beginning to flow from a plumbed oxygen source through supply tube 24. Such tethered control of oxygen flow is known in the art and is commonly used in aircraft with so-called "DIXIE" cup type oxygen masks. The user must then remove and discard tamper-evident wrapper 22. Wrapped device 100 can then be quickly formed into its functional hood shape.

As depicted in FIG. 3, a hood 30 preferably has a generally cylindrical shape, although other shapes may also be used. The top of hood 30 is enclosed and the bottom is open as described further hereafter. A preferred size of hood 30 is eighteen liters to accommodate users of all ages. Hood 30 is preferably constructed of a transparent material, such as an appropriate fluorocarbon material, to permit 360° visibility for the user, but not all the circumferential extent need necessarily be transparent, so long as normal visibility is achieved. The hood material is preferably light in weight, collapsible for long periods of storage, and recoverable to a desired shape for use. Hood 30 is preferably substantially airtight to protect the user from smoke, toxic fumes and hypoxia. The hood material may also be flame-resistant and heat-resistant for additional safety in a hostile environment.

Hood 30 has a base 32 with a circumference substantially conforming to the circumference of the bottom of hood 30. Base 32 is most clearly seen in FIG. 4b and is constructed of a sheet-like flexible elastic material, such as rubber or silicone formulated to be tough and elastic, but resistant to deterioration from ozone. Base 32 is fixedly attached to hood 30, normally around the circumference of the base. The attachment between hood 30 and base 32 is substantially airtight to isolate the atmospheres inside and outside hood 30 during use.

Figure 4A:
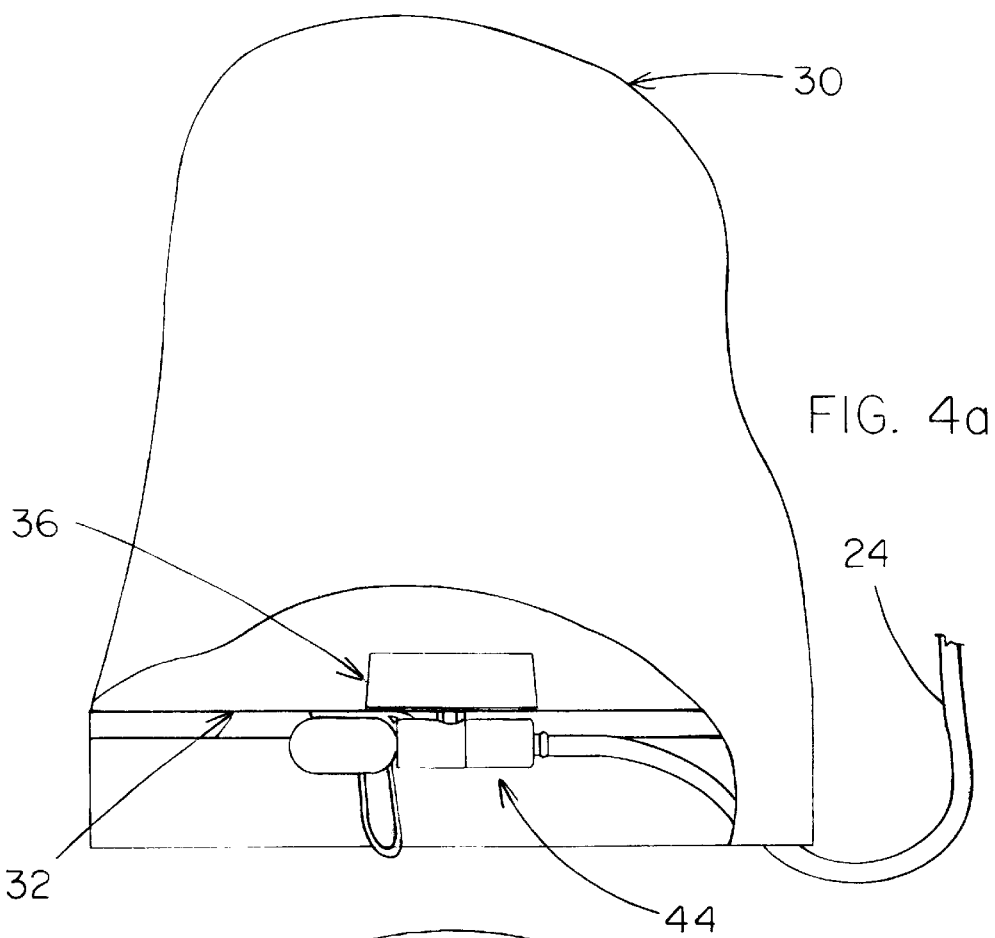
FIG. 4a shows the smokehood and oxygen supply device of FIG. 3 partially broken away.
Figure 4B:
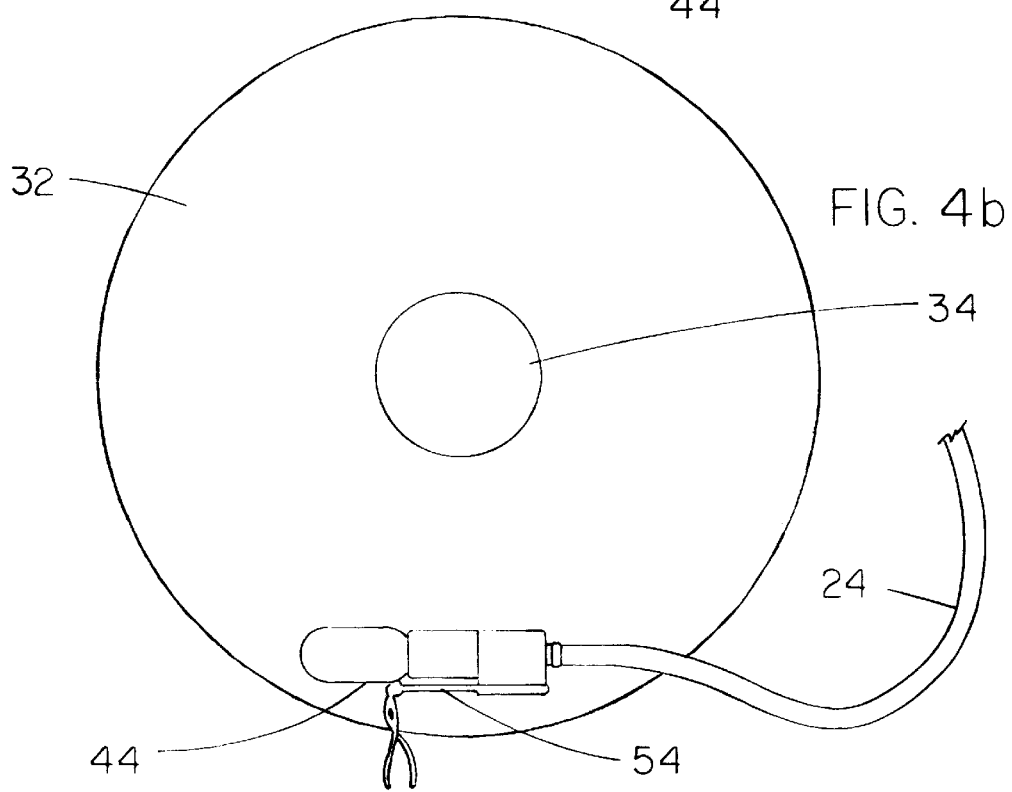
FIG. 4b shows the smokehood and oxygen supply device from a bottom plan view.
Figure 5:
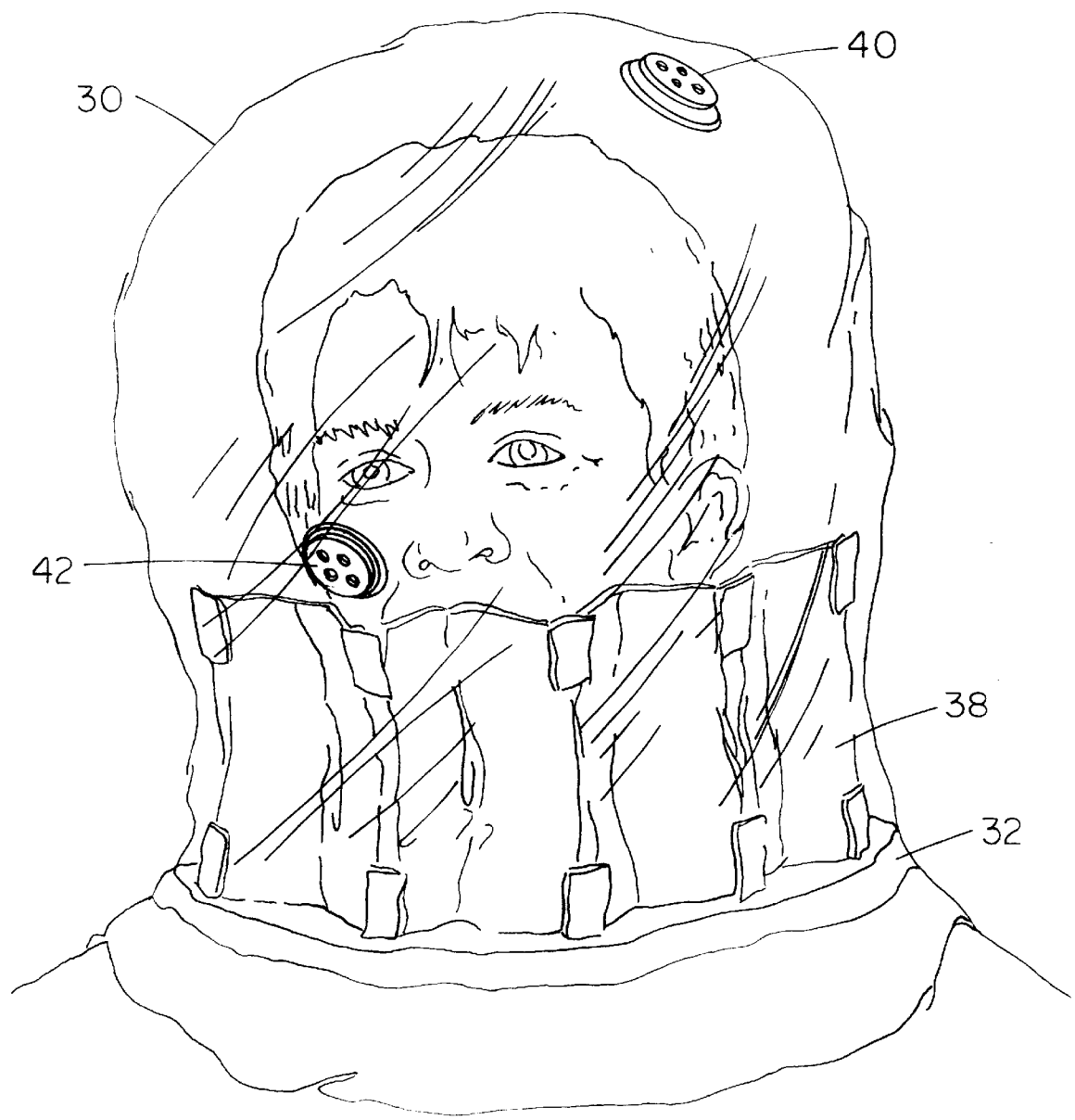
FIG. 5 shows the smokehood and oxygen supply device in use after it has been donned by a user.

Base 32 contains an opening 34 with a neck flange or neck seal 36, as shown in FIGS. 4a and 4b. Opening 34 is preferably sized to stretch sufficiently to permit insertion of the user's head into hood 30, and for neck flange 36 to form a seal around the user's neck. FIG. 5 schematically shows device 100 in use position on a user.

As shown in FIG. 5, a gas scrubber panel (or "blanket") 38 is preferably attached to the inside wall of hood 30. Scrubber panel 38 serves to chemically absorb or otherwise neutralize the effects of carbon dioxide exhaled by the user while using device 100. Preferably, scrubber panel 38 includes a blanket of lithium hydroxide contained in layers of fabric. However, other chemicals or combinations thereof may perform a similar function. Although a single scrubber panel is shown in FIG. 5, multiple scrubber panels may be used.

Fixedly installed on hood 30 are an overpressure relief valve 40 and an anti-suffocation valve 42. Overpressure relief valve 40 is provided as a check to prevent overpressure in hood 30 causing it to rupture in the situation that pressure within hood 30 exceeds desired levels. The pressure-limit of overpressure relief valve 40 is preferably 0.5 inches of water. Anti-suffocation valve 42 is provided to prevent suffocation if either oxygen source malfunctions by allowing air to be drawn into hood 30 in the unlikely event of any such malfunction. The pressure-limit of antisuffocation valve 42 is also 0.5 inches of water, which should be sufficient to respond to negative pressure within hood 30 resulting from a lack of air supply in response to the user's inhalation.

Figure 6:
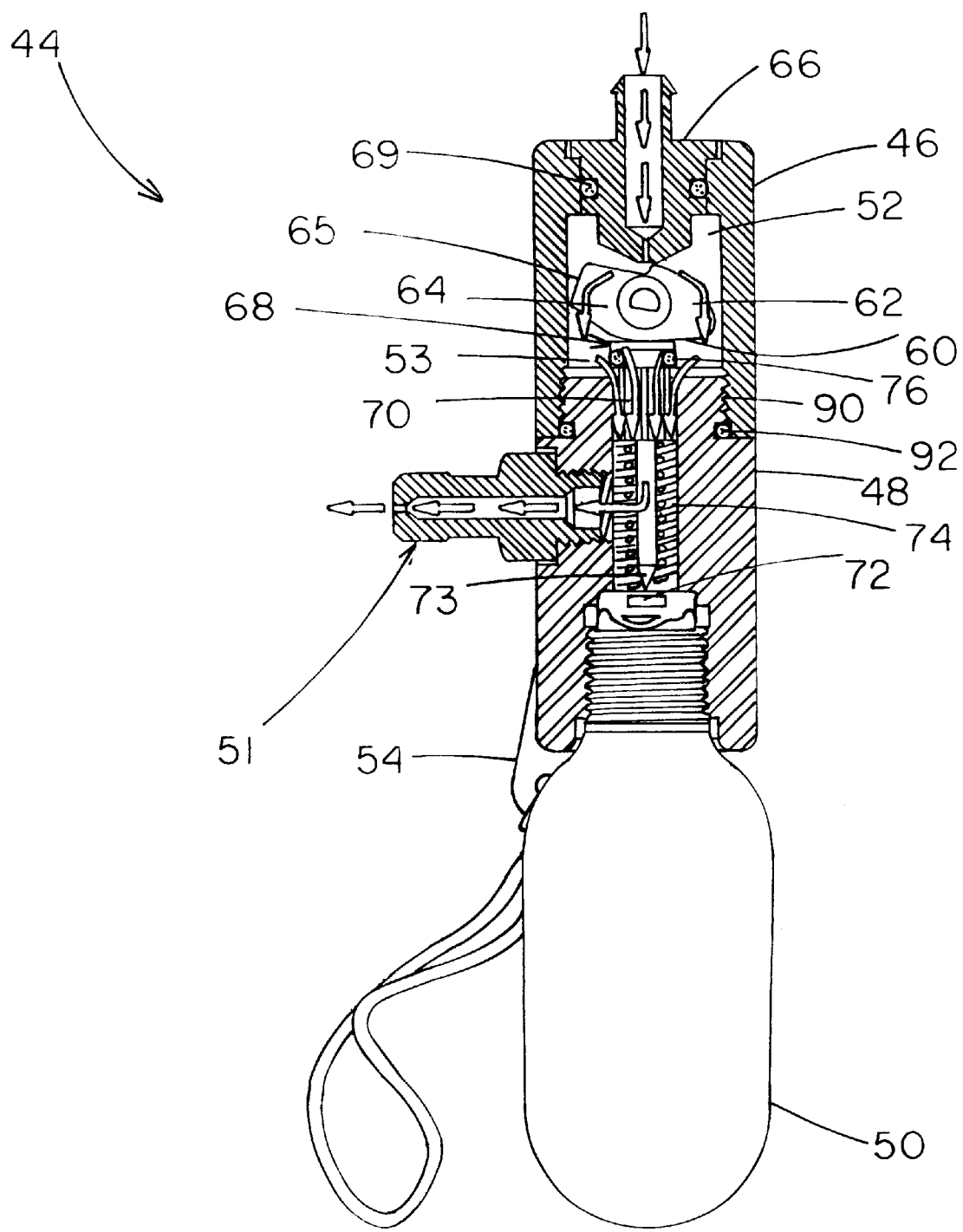
FIG. 6 schematically illustrates the flow of oxygen from the plumbed source before switching to the portable source of oxygen.
Figure 7:
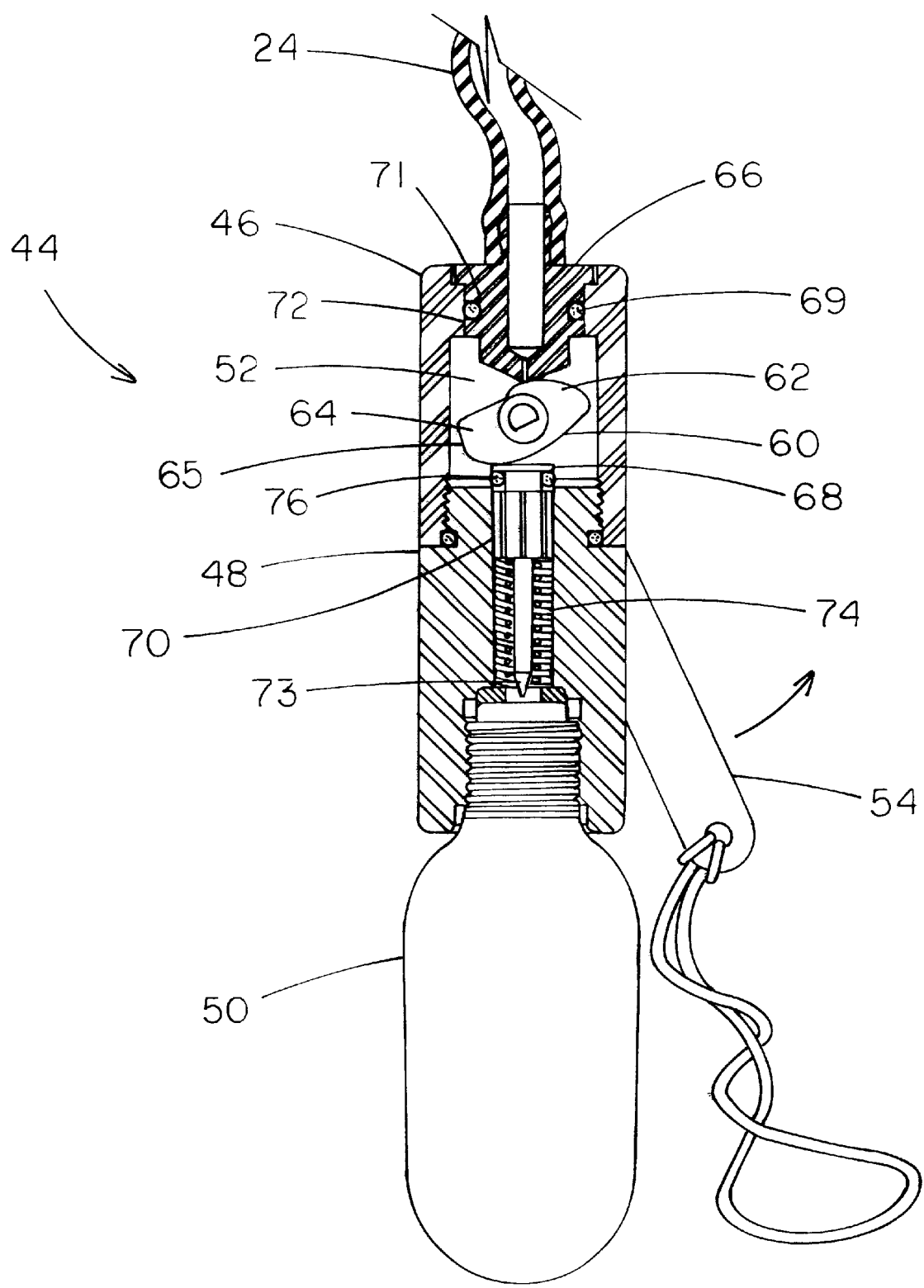
FIG. 7 shows the internal components of the oxygen control device during the preliminary stage of switching to the portable source of oxygen.

Fixedly attached to hood 30 is a compact oxygen control device 44 as shown in FIGS. 4a and 4b. Oxygen control device 44 is elongated and generally tubular with a flattened side to accommodate lever 54 adjacent thereto. Oxygen control device 44 is ideally no more than five inches in length and one inch in width in the preferred embodiment, although it is understood that reasonable variations in size and shape of the various parts of device 100 can be conceived to accommodate possible differences in the general use environment. As shown in FIG. 6, oxygen control device 44 preferably has a valve body consisting of a top portion 46 and a middle portion 48, and an oxygen bottle 50 threadably connected to middle portion 48. Top portion 46 is typically threadably connected to middle portion 48 by threads 90, and the connection therebetween is made substantially airtight by virtue of an O-ring such as that indicated at 92. Top portion 46 includes a disconnect system 66 fixedly connected to a plumbed on-board source of oxygen via supply tube 24. (Supply tube 24 is not shown in FIG. 6 for clarity of disconnect system 66. Supply tube 24 connected to disconnect system 66 is depicted in FIG. 7.)

Middle portion 48 has a nozzle 51 extending from it. Nozzle 51 leads into hood 30, and is ideally sealed with hood 30 at its point of entry therein. Breathable oxygen flows into hood 30 through nozzle 51, which provides the only air communication between the atmosphere inside hood 30 from outside the hood during use.

FIG. 6 shows a sectional view of oxygen control device 44 in its initial default position. By default, oxygen control device 44 permits oxygen to flow into hood 30 from the plumbed source only, which occurs through supply tube 24. (Supply tube 24 is not shown in FIG. 6 for clarity of disconnect system 66. Supply tube 24 connected to disconnect system 66 is depicted in FIG. 7.) Breathable oxygen flows from supply tube 24 through a cavity 52 in middle portion 48, as indicated by arrows in FIG. 6.

Figure 13C:
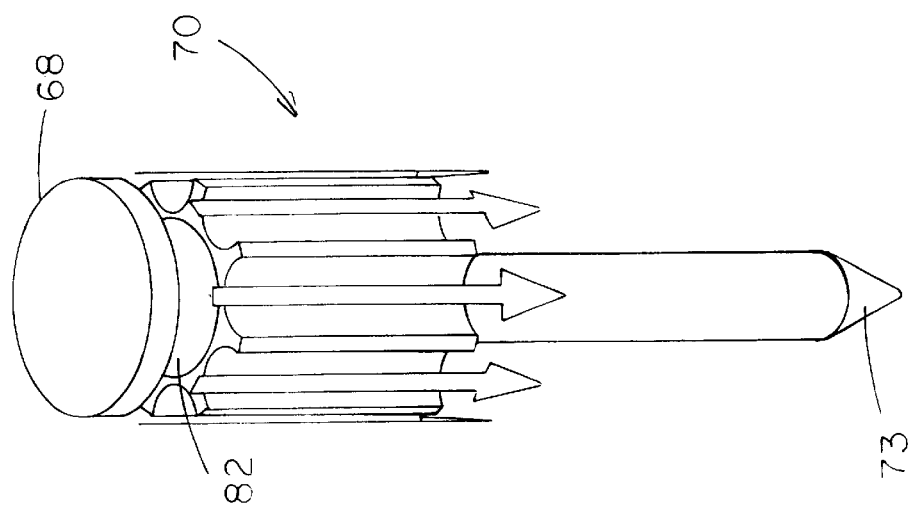
FIG. 13c is upper perspective view of the pierce pin, enlarged with arrows indicating the flow of breathable oxygen through striations.
Figure 13B:
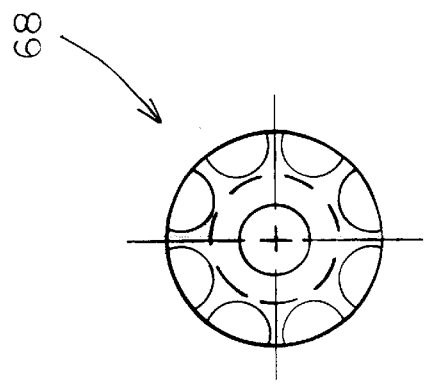
Figure 13A:
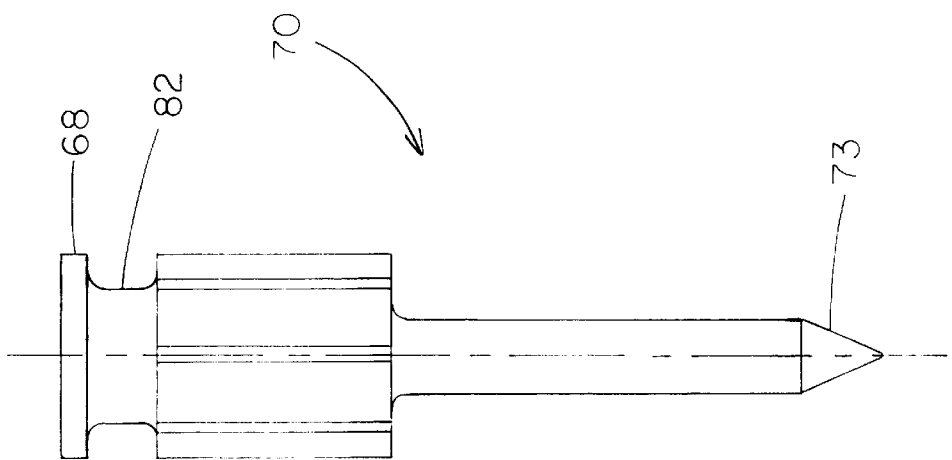

The separation between top portion 46 and middle portion 48 contains an opening 53. Opening 53 is the only path of gas communication between the two portions. A pin 70 which acts as a piercer is positioned in opening 53 with its lower body extending into middle portion 48 and its head 68 extending into top portion 46. Pierce pin 70 preferably contains striations, preferably eight striations to permit oxygen flow through, as indicated by the arrows in FIG. 6. This feature is also shown in FIGS. 13a, 13b and 13c. Other alternative embodiments instead of striations may also perform the desired function. Examples include, but are not limited to, grooves and spiral notches. Cavity 52 is sealed, when oxygen is flowing from the bottle, by the body of pierce pin 70 and the O-ring under head 68.

Pierce pin 70 is maintained in its default position within oxygen control device 44 by virtue of a coiled spring 74. The force of spring 74 pushes pierce pin 70 away from oxygen bottle 50, while head 68 of pierce pin 70 rests against cam 60. So positioned, the striations in pierce pin 70 are exposed to cavity 52 in top portion 46, thereby permitting gas flow, as shown by arrows in FIG. 6. The body of pierce pin 70 preferably contains a small groove 82 (depicted in FIG. 13a) substantially adjacent to head 68. An O-ring 76 is positioned in groove 82. Pointed end 73 of pierce pin 70 is positioned in close proximity to oxygen bottle 50.

When device 100 is first unwrapped, the initial flow of breathable oxygen from the plumbed source fills hood 30. The user can take the inflated hood 30 and don it by inserting his head through opening 34 in base 32. After donning hood 30, the user will breathe only air within hood 30 because neck flange 36 forms a substantially air tight seal around his neck and the atmospheres within and outside hood 30 are then substantially isolated from each other. Thus, the user is safely provided with a continuous supply of breathable oxygen available in hood 30 from the plumbed source.

When the user chooses to be free from being restrained to the plumbed source of oxygen, such as to evacuate from an aircraft, the user can switch to the auxiliary supply of breathable oxygen contained in an oxygen bottle 50. This is accomplished by virtue of an actuator. To selectively switch to the auxiliary supply of oxygen, the user pulls a lever 54, such as that shown in FIG. 12b, for example, which lever serves as an actuator. Pulling lever 54 causes it to rotate in the direction shown by the arrow in FIGS. 7 and 8. Lever 54 is preferably constructed of metal, such as stainless steel, although other materials will suffice.

Referring to FIG. 7, lever 54 is connected by a shaft to a uniquely shaped bi-lobed cam 60 positioned in cavity 52. Rotation of lever 54, therefore, causes cam 60 to rotate in the same direction as the lever. Cam 60 has a first lobe 62 and a second lobe 64. When cam 60 rotates, first lobe 62 pushes against a disconnect system 66 positioned in top portion 46. Simultaneously, second lobe 64 pushes in the opposite direction applying longitudinal force against head 68 of pierce pin 70.

Disconnect system 66 is positioned in top portion 46 preferably by virtue of an O-ring 69 situated in a groove 71 and a relatively smaller groove 72. Due to pressure upon disconnect system 66 from first lobe 62 of rotating cam 60, disconnect system 66 is dislodged from its position in top portion 46 as O-ring 69 yields its position in the relatively smaller groove 72.

Figure 8:
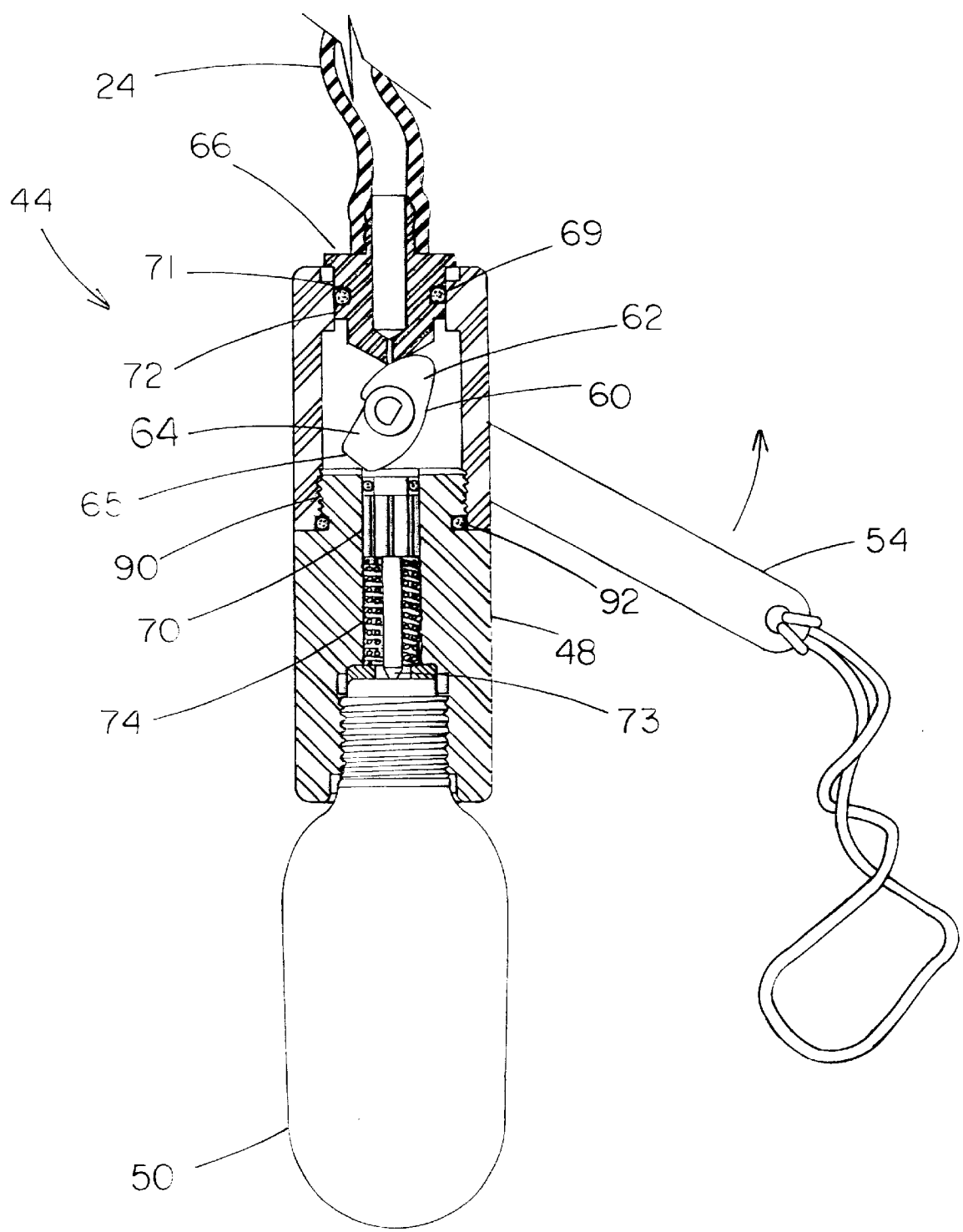
FIG. 8 shows the internal components of the oxygen control device during the latter stage of switching to the portable source of oxygen.
Figure 9:
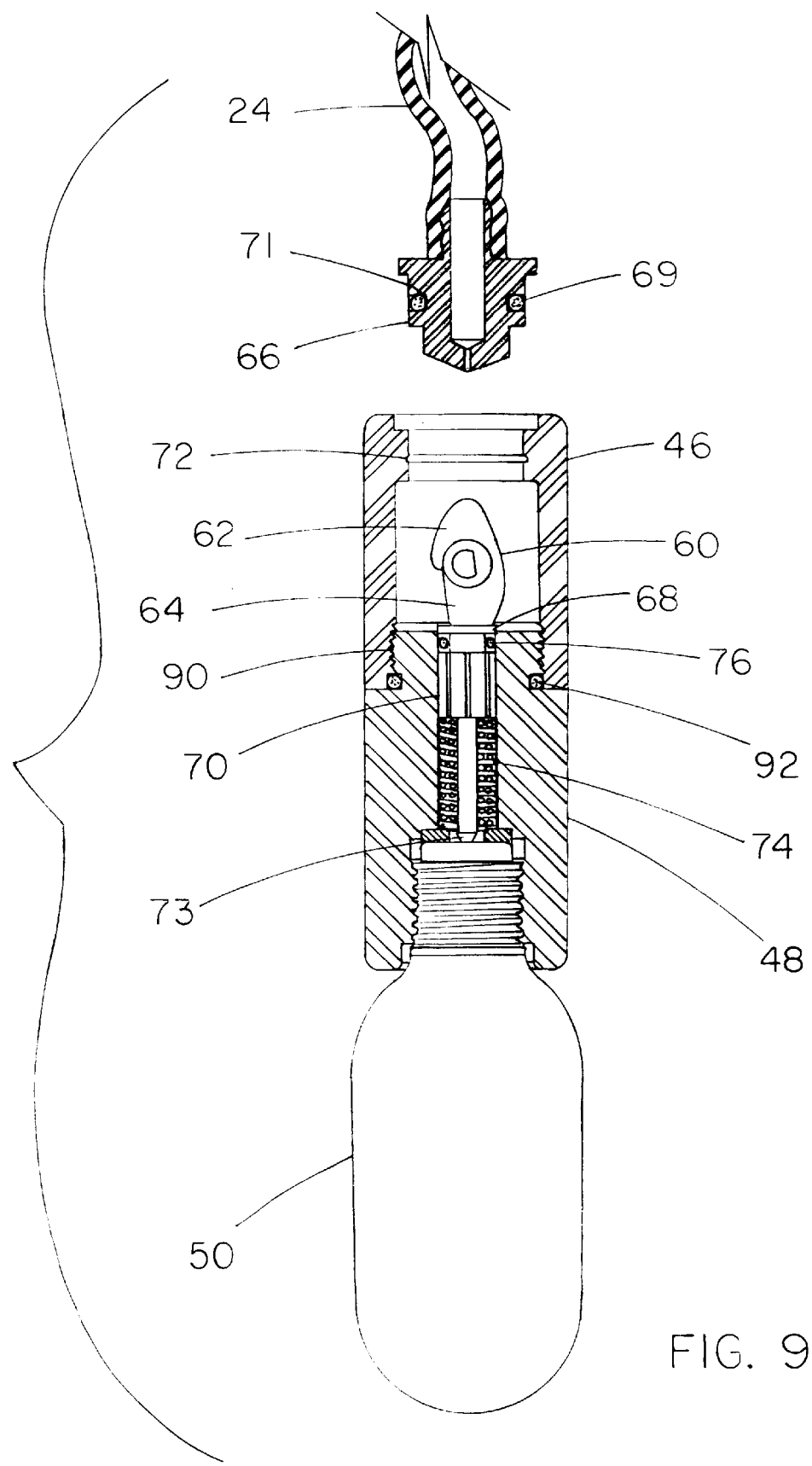
FIG. 9 shows the internal components of the oxygen control device after the switchover to the portable source of oxygen is complete.

As shown in FIG. 9, as cam 60 continues rotating from the position shown in FIG. 7 to the position shown in FIG. 8, the first lobe 62 continues pushing the dislodged disconnect system 66. Eventually, first lobe 62 reaches a position approximately 113.5° from its initial default position. At this point disconnect system 66 can be completely detached from top portion 46.

Figure 11A:
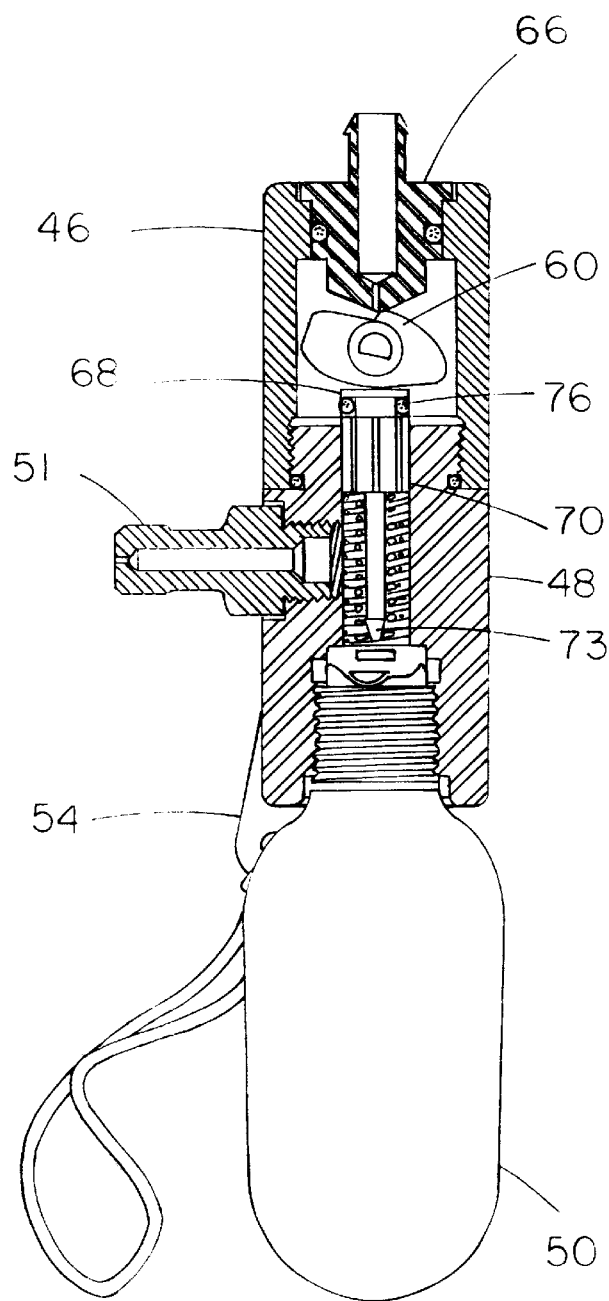
FIGS. 11a and 11b show a sectional view and exterior view, respectively, of the oxygen control device prior to the switching operation.
Figure 11B:
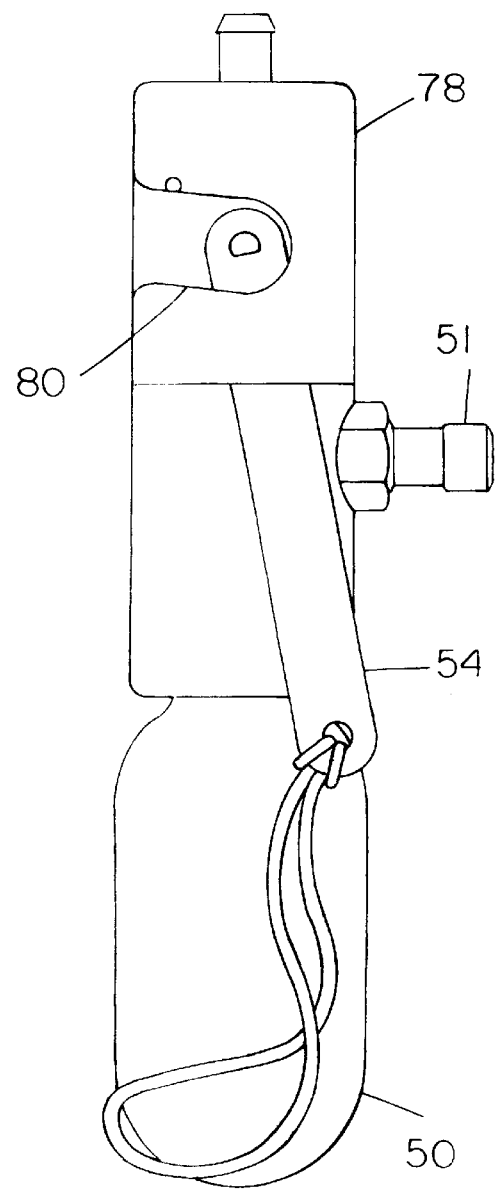
Figure 12A:
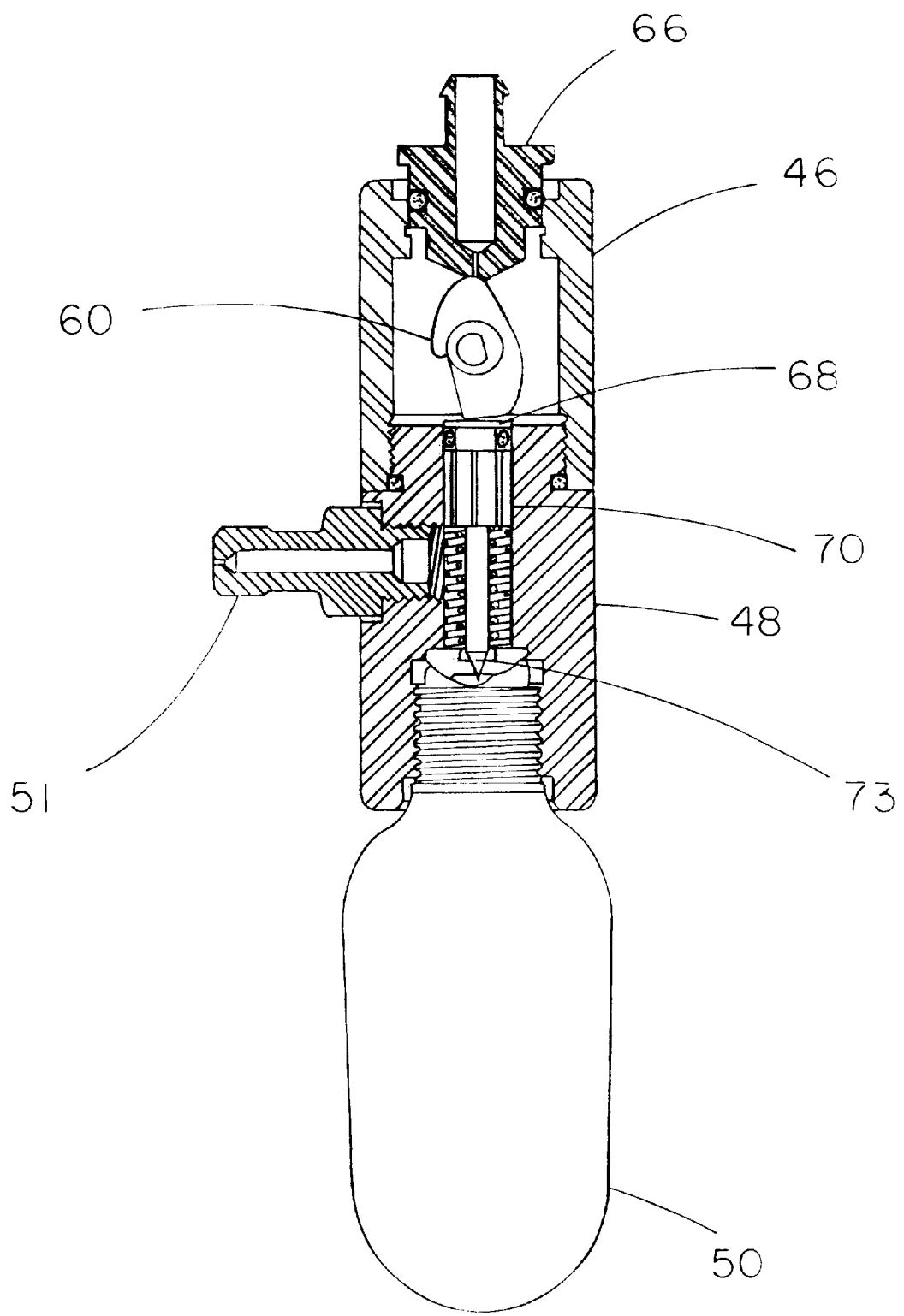
FIG. 12a is a sectional view and exterior view of the oxygen control device of FIG. 1 when the cam is in overtravel position during the switching operation.
Figure 12B:
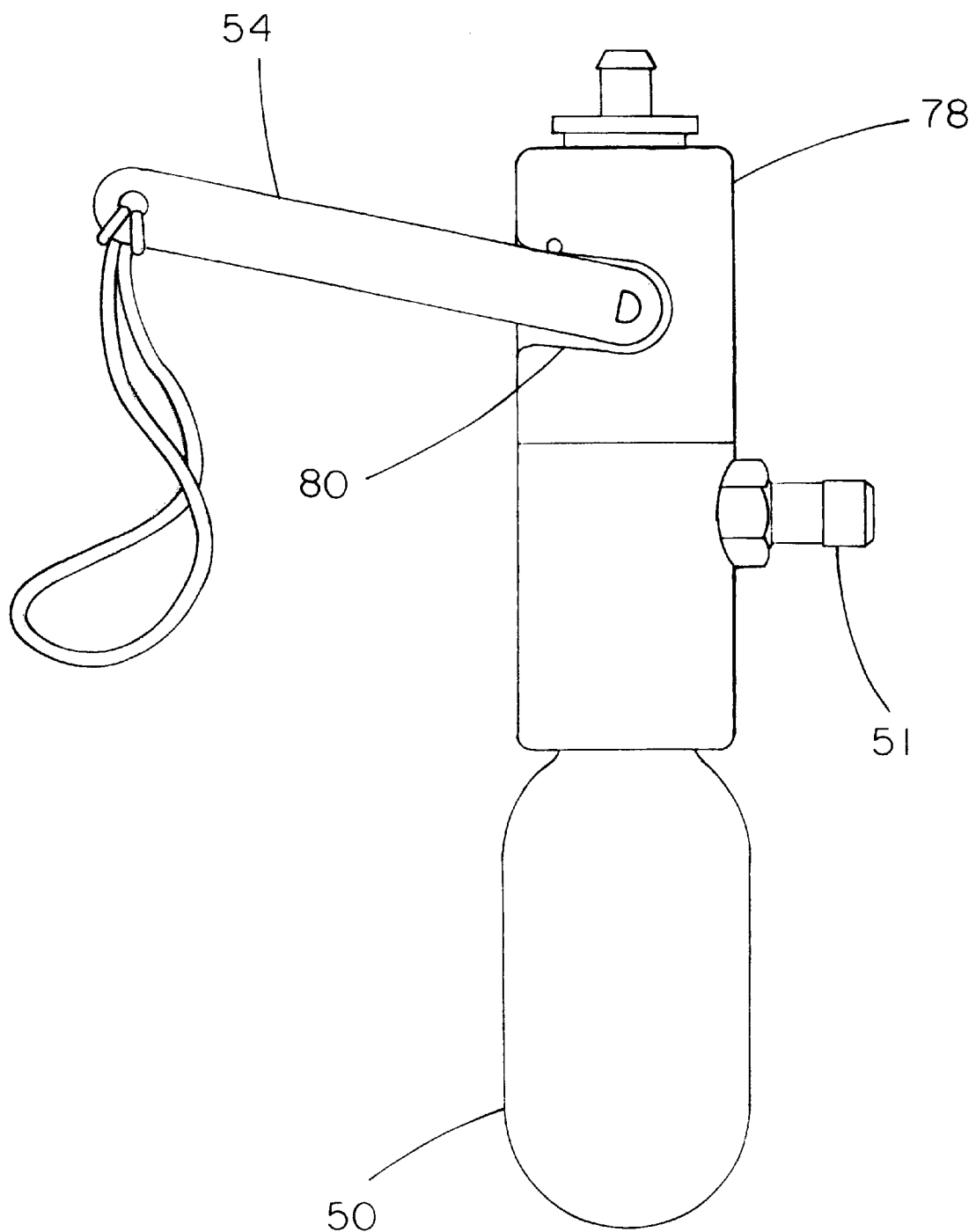

Upon cam 62 reaching the position illustrated in FIG. 9, lever 54 (not seen in this figure) is preferably also dislocated from oxygen control device 44 and discarded. The dislocation of lever 54 occurs by virtue of an exterior collar 78 on top portion 46. Collar 78 is depicted in side views of oxygen control device 44 in FIGS. 11*b* and 12*b*. (FIGS. 11*a* and 12*a* are corresponding sectional views therefor depicting the associated position of cam 60.) FIG. 11*b* shows a preferably elongated notch 80 in exterior collar 78, which notch 80 prevents lever 54 from sliding off device 44 until the switchover operation is complete. Upon rotating about 113.5°, lever 54 reaches the position depicted in FIG. 12*b* whereby it is substantially aligned with notch 80. Notch 80 thereby permits lever 54 to slide outwardly and off the shaft that connects it to cam 60. This indicates to the user that he has rotated lever 54 sufficiently as to ensure a completed switchover of the source of breathable oxygen supply.

Referring to FIGS. 7 and 8, when cam 60 rotates as lever 54 is rotated, second lobe 64 pushes head 68 of pierce pin 70 against the force of spring 74. As a result, pointed end 73 of the advancing pierce pin 70 pierces oxygen bottle 50. Simultaneously, head 68 of pierce pin 70 and O-ring 76 enter opening 53 in middle portion 48 of oxygen control device 44. Eventually, as shown in FIG. 9, when cam 60 rotates approximately 113.5° from its initial default position, second lobe 64 pushes head 68 of pierce pin 70 and O-ring 76 far enough to seal opening 53. Head 68 and O-ring 76 thus seal the only channel of gas communication between top portion 46 and middle portion 48.

Figures 15A, 15B:
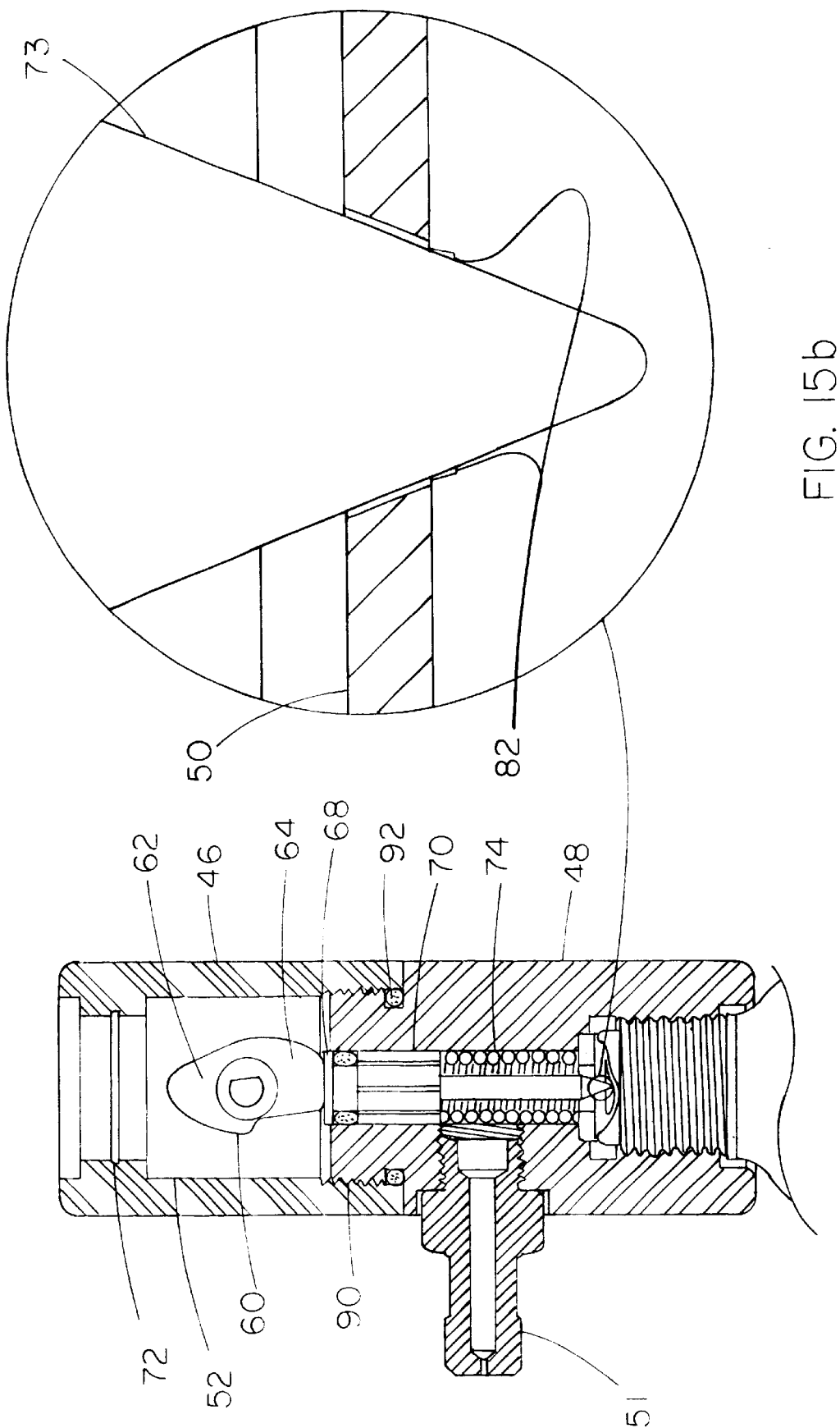
FIG. 15a is a sectional view of the oxygen control device in post switching position.
FIG. 15b is an enlarged portion of FIG. 5a, showing the tip of the pierce pin and the orifice created in the oxygen cylinder end cap after the switching operation is complete.

Second lobe 64 is configured to provide a flat end 65. Flat end 65 is designed to abut with head 68 of pierce pin 70, causing cam 60 to come to rest in the position shown in FIG. 9. This, however, does not occur until after a few degrees of overtravel by cam 60. The overtravel occurs by virtue of the design of cam 60, particularly the design of second lobe 64, shaped as shown in the figures. The overtravel occurs typically in the range of 1° to 9°. FIG. 14*a* shows cam 60 with a few degrees of overtravel. The pierce pin 70, however, returns from the overtravel to the abutting position shown in FIG. 9 by virtue of the design of second lobe 64 of cam 60 and the force of return spring 74. Pierce pin 70 is thereafter held in its new position because flat end 65 abuts with head 68 of pierce pin 70. FIG. 15*a* shows pierce pin 70 in this position subsequent to returning for connection to and use with the new oxygen control device 44, from its overtravel position. As previously explained, when cam 60 achieves this position disconnect system 66 detaches and lever 54 also detaches from oxygen control device 44.

Figure 10:
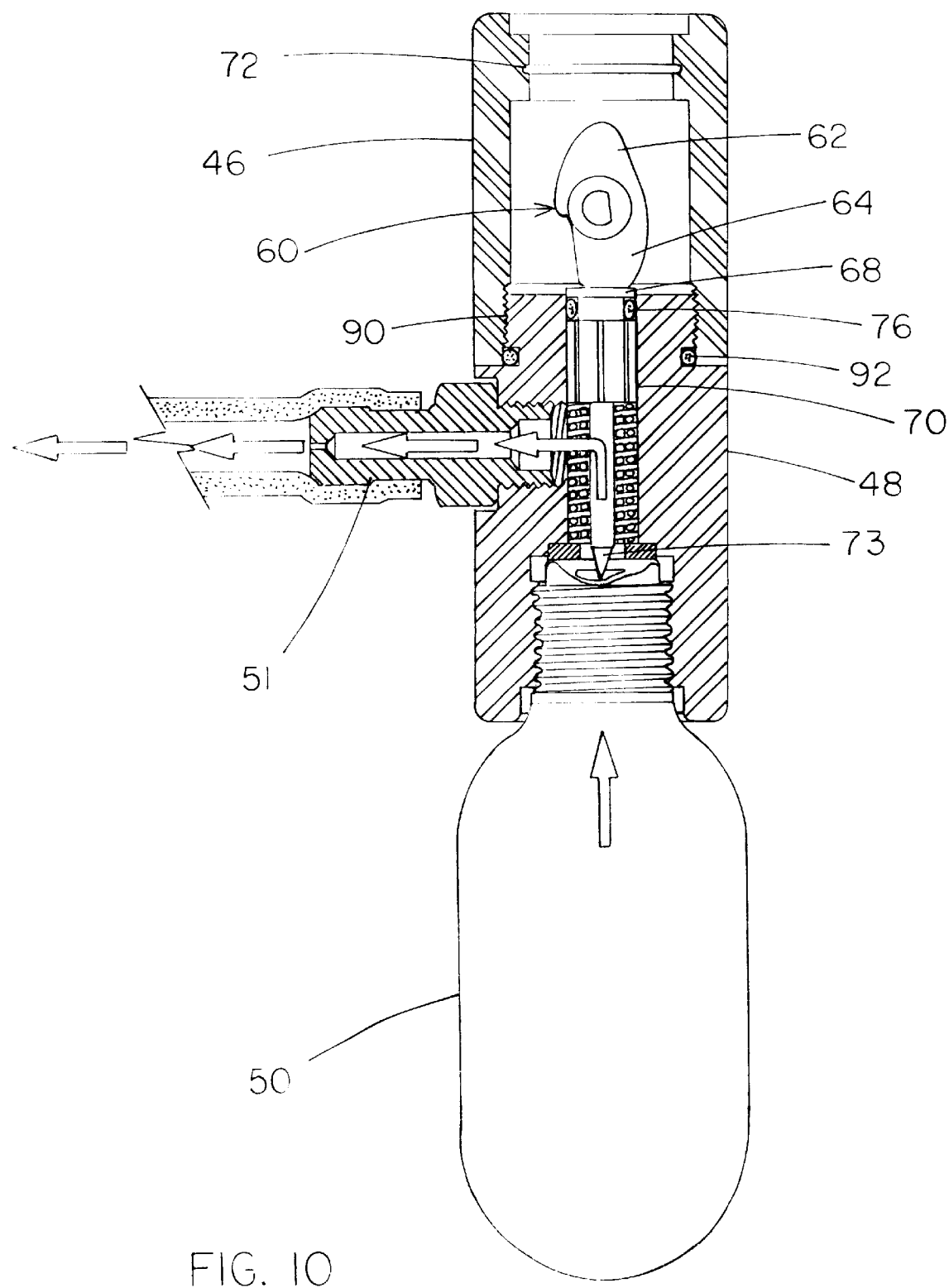
FIG. 10 shows a schematic display of the flow of oxygen from the portable source of oxygen after the oxygen supply switching operation is complete.

The overtravel of pierce pin 70 and its subsequent return serve an important purpose in the instant invention. The dimension of the pierced hole in oxygen bottle 50 is maximum when pierce pin 70 is in its overtravel position. This is shown in FIG. 14*b* in an enlarged view. Its subsequent retreat from that position leaves an orifice 82 between pointed end 73 of pierce pin 70 and the pierced hole in oxygen bottle 50. This is shown in FIG. 15*b* in enlarged view. This orifice 82 serves as a channel of gas flow from oxygen bottle 50 into middle portion 48. Breathable oxygen thus flows from oxygen bottle 50 through nozzle 51 into hood 30, and is available to the user for breathing. This is depicted by arrows in FIG. 10. It is also conceived that a conventional style drop-down face mask can also be adapted.

It may thus be appreciated by one skilled in the art that using the spring-back of pierce pin 70 to control airflow from oxygen cylinder 50 allows the use of only one nozzle (nozzle 51) to handle airflow from two sources which are at dramatically different pressures. Flow rate through nozzle 51 is a function of line pressure and the cross sectional area of the nozzle's opening. Plumbed oxygen systems typically operate at around 65 psig, while oxygen cylinder 50 is preferably pressurized to 3,000 psig to keep its size to a minimum. A nozzle opening sized to provide adequate flow from a plumbed system would be too large for the high pressure cylinder 50. Conversely, if the nozzle opening was sized for cylinder 50, breathable oxygen flow from the plumbed system, which contains comparatively lower pressure air, would be inadequate. The instant invention, therefore, allows for two different breathable oxygen sources which are at drastically different pressures, but without the need to add a second nozzle. The controlled spring-back of pierce pin 70 facilitates this novel feature.

As previously explained, lever 54 is designed not to detach unless cam 60 has rotated sufficiently for flat end 65 of second lobe 64 to abut against head 68 of pierce pin 70. It may be appreciated that this ensures that head 68 of pierce pin 70 and seal 76 have sealed off the flow of air from the ambient atmosphere into hood 30 through the now empty top portion 46. It further ensures that pointed end 73 of pierce pin 70 sufficiently penetrates oxygen cylinder 50 to cause commencement of airflow therefrom. Thus, the physical detachment of lever 54 signifies to the user that the oxygen supply has switched over successfully. Other visual, audible or tactile signals can also be conceived by one skilled in the art, which signals can be incorporated to make clear to the user that the switchover is complete.

When disconnect section 66 detaches and lever 54 slides off, oxygen control device 44, and therefore device 100 and the user, are physically detached from supply tube 24 and the plumbed source of oxygen. The user is then no longer restrained by connection to the plumbed source and is free to pursue escape with a portable supply of breathable oxygen to hood 30. It may also be appreciated that the switchover of breathable oxygen supply into hood 30 occurs simultaneously in one action of pulling the lever. Such facile changeover is critical, especially in circumstances which may readily induce panic in the use of the new device.

It may further be appreciated that oxygen control device 44 is usable with other types of emergency breathing apparatus while performing a substantially similar function. For example, it may be used with a mask instead of a hood, such as a cup-type mask commonly used in the art. The user may receive breathable oxygen in the mask initially from a plumbed source, and then switch over to the auxiliary source to be free to pursue escape and safety.

The foregoing demonstrates that the several objects of the invention are achieved and other advantages are attained. Although the foregoing includes a description of the best mode contemplated for carrying out the invention, various modifications are contemplated. As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. An emergency breathing device for providing a user with breathable oxygen and protection, the device comprising:
   a hood disposed in a premises proximate to an oxygen control device;
   the oxygen control device connected exteriorly of the hood and including a valve body, an actuator, and an oxygen bottle mated to the valve body;
   the valve body providing airflow communication with an interior of the hood;
   the oxygen control device connected to a plumbed breathable oxygen supply through a plumbed source disconnect mechanism which is removably connected to the valve body, and which when connected permits airflow from the plumbed breathable oxygen supply and valve body to the interior of the hood;
   a piercing mechanism within the valve body for causing airflow to commence from the oxygen bottle in response to operation of the actuator; and
   a cam within the valve body rotatable in response to operation of the actuator, the cam being disposed to engage the piercing mechanism when rotated, thereby causing penetration of the bottle, permitting oxygen to flow from the oxygen bottle to the interior of the hood and simultaneously forcing the plumbed source disconnect mechanism to disconnect from the valve body,
   whereby the user may don the hood to receive breathable oxygen initially from the plumbed source and thereafter from the oxygen bottle upon operation of the actuator, or from the oxygen bottle alone.

2. An emergency breathing device according to claim 1, wherein the piercing mechanism is a pin held in position by a spring providing tactile force in a direction away from the oxygen bottle.

3. The emergency breathing device of claim 2, wherein the pin has a body, and an O-ring mounted on the body of the pin.

4. An emergency breathing device according to claim 3, wherein the valve body has a channel and the O-ring mounted on the body of the pierce pin is disposed in a position to seal the channel in the valve body upon operation of the actuator, to thereby prevent airflow communication provided by the valve body.

5. An emergency breathing device according to claim 1, wherein the cam has a shaft extending therefrom and the actuator is a lever connected to the shaft, to thereby permit a user to selectively activate the oxygen control device by operation of the lever.

6. An emergency breathing device according to claim 5, wherein the lever is detachable from the cam shaft upon disconnection of the plumbed source disconnect mechanism from the valve body and initiation of oxygen flow from the attached oxygen bottle.

7. An emergency breathing device according to claim 1, wherein the cam has a first lobe and a second lobe, the second lobe having at least one flat surface.

8. An emergency breathing device according to claim 7, wherein the at least one flat surface of the second lobe of the cam abuts the piercing mechanism after operation of the actuator.

9. An emergency breathing device according to claim 1, wherein the valve body has at least a top portion and a middle portion connected to the top portion.

10. An emergency breathing device according to claim 9, wherein the top portion of the valve body defines a cavity, and the cam is positioned in a default position within the cavity.

11. An emergency breathing device according to claim 9, wherein the top portion contains part of the piercing mechanism and the middle portion contains the remainder of the piercing mechanism, the piercing mechanism comprising a pin and a spring, and the pin defining at least one opening for gas communication between the top portion and the middle portion.

12. An emergency breathing device according to claim 1, and further comprising a carbon dioxide absorption member within the hood to absorb carbon dioxide exhaled by the user.

13. An emergency breathing device according to claim 12, wherein the carbon dioxide absorption member comprises lithium hydroxide.

14. An emergency breathing device according to claim 1, and further wherein the hood has a pressure relief device, to thereby provide gas pressure relief from the interior space to exterior of the hood.

15. An emergency breathing device according to claim 1, and further wherein the hood has an anti-suffocation device to thereby provide suffocation relief for the user.

16. An emergency breathing device according to claim 1, and further comprising a tamper evident container for storing the emergency breathing device.

17. An oxygen control device comprising:
    a valve body having a continuous side wall defining an interior;
    a disconnect system detachably positioned in the valve body, the disconnect system having a default positon;
    a piercing mechanism retained in the interior of the valve body by a biasing means which exerts a force sufficient to keep the piercing mechanism within the interior of the valve body; and
    a cam having a first lobe and a second lobe and connected to a shaft attached to a lever, the cam positioned in the interior of the valve body so that rotation of the cam causes the first lobe to dislocate the disconnect system from the default position and the second lobe to simultaneously push the piercing mechanism against the force of the biasing means, causing the piercing mechanism to achieve an overtravel position and then partially retreat from the overtravel position.

18. The oxygen control device of claim 17, and further comprising an oxygen cylinder connected to the valve body, whereby the piercing mechanism penetrates the oxygen cylinder in the overtravel position, and the piercing mechanism then partially retreats from the overtravel position and thereby creates an orifice between the piercing mechanism and the oxygen cylinder for flow through of breathable oxygen to the hood.

19. The oxygen control device of claim 18, wherein the piercing mechanism is a pin.

20. The oxygen control device of claim 19, wherein the force applicator is a spring.

21. The oxygen control device of claim 17, wherein the valve body contains a mechanism to allow the lever to detach when the cam has rotated a predetermined angle.

22. The oxygen control device of claim 21, wherein the valve body has an exterior collar and the mechanism to allow the lever to detach is an elongated notch in the exterior collar, to thereby prevent the lever from sliding off the shaft until the lever has rotated to a position wherein it is substantially aligned with the notch, when the cam has rotated to a predetermined angle.

23. The oxygen control device of claim 17, wherein the device is connectable to a hood.

24. The oxygen control device of claim 17, wherein the device is connectable to a mask.

25. An emergency oxygen supply device comprising:
a hood having a continuous side wall of sufficient perimeter size to fit over a person's head, a top connected to and closing an outermost end of the continuous wall, and an open bottom;
the wall constructed substantially entirely of an airtight collapsible material and having at least a portion which is transparent;
the bottom of the hood defining an opening, the opening having a circumference;
a base having a circumference and constructed of a flexible elastic material;
the circumference of the base substantially conforming to the circumference of the opening at the bottom of the hood;
the base fixedly attached and sealed at its circumference to the circumference of the bottom of the hood;
a circular opening in the base with an integral flange lining the perimeter of the circular opening;
a carbon dioxide absorption device attached to the interior of the hood;
a pressure relief member installed in the wall of the hood;
an anti-suffocation means installed in the wall of the hood;
an oxygen source control device attached to the hood, the oxygen source control device comprising:
a top portion, the top portion containing an interior;
a middle portion mated to the top portion, the middle portion containing an interior, the interior of the middle portion containing a channel of gas communication, the channel of gas communication having a circumference;
a portable oxygen source;
a nozzle attached to the middle portion, the nozzle containing a gas exit having direct communication with the interior of the hood;
a detachably positioned disconnect system fixedly attached to a plumbed source of breathable oxygen;
a cam positioned in the interior of the top portion, the cam comprising a first lobe and a second lobe;
a lever detachably connected to the cam;
a piercing mechanism positioned in the channel of gas communication in the middle portion, the piercing mechanism comprising a pierce pin having a longitudinal body, a head and a pointed end, the head having a circumference;
the longitudinal body of the pierce pin containing means to permit gas communication;
the pointed end of the pierce pin positioned in close proximity to the portable oxygen source;
a spring positioned in the interior of the middle portion, the spring surrounding the longitudinal body of the pierce pin and cooperating with the pierce pin to form a needle valve between the pointed end of the pierce pin and the portable oxygen source, said needle valve allowing the nozzle to accommodate flow from two sources operating under different pressures;
the head of the pierce pin positioned in the first portion between the cam and the channel of gas communication in the middle portion; and
the circumference of the head of the pierce pin substantially conforming to the circumference of the channel of gas communication to accommodate the head.

26. The emergency oxygen supply device of claim 25, and further comprising:
a first annular groove on the disconnect device;
a second annular groove in the interior of the top portion, the second annular groove corresponding to the first annular groove when the disconnect system is connected;
the second annular groove being smaller in size than the first annular groove; and
an O-ring positioned between the first annular groove and the second annular groove.

27. The emergency oxygen supply device of claim 25, and further comprising:
a tether connecting the supply device to a plumbed source of breathable oxygen, to thereby permit breathable oxygen to flow from the plumbed source of breathable oxygen to the oxygen control device upon pulling of the tether.

28. The emergency oxygen supply device of claim 25, and further comprising a second O-ring mounted coaxially on the pierce pin and positioned between the head of the pierce pin and the channel of gas communication.

29. An emergency breathing device for providing a user with breathable oxygen and protection before and during premises evacuation, the device comprising:
a hood having an uncompacted use configuration and a compacted storage configuration and being of sufficient size and appropriate shape when in use configuration to be capable of being worn upon the user's head, the hood being at least partially formed of collapsible, flexible material which is substantially airtight, and which in use configuration substantially covers a user's head and defines an interior breathing space around the user's head;
the hood also including an elastic portion defining an expandable opening to form a seal about the user's neck when the hood is donned by the user;
an oxygen control device joined to the hood and including a valve body, an actuator, and an oxygen bottle for containing breathable oxygen, the oxygen bottle being mated to the valve body and the valve body being in airflow communication with the interior breathing space of the hood;
a plumbed breathable oxygen supply connected to the oxygen control device through a plumbed source disconnect mechanism removably connected to the valve body, and being in airflow communication with the interior breathing space of the hood;
oxygen release mechanism within the valve body for causing oxygen flow to commence from the oxygen bottle in response to operation of the actuator; and
an actuator mechanism for causing the oxygen release means to commence airflow from the oxygen bottle to the interior breathing space of the hood and simultaneously forcing the plumbed source disconnect mechanism to disconnect from the valve body,
whereby the user may don the hood in the use configuration to receive breathable oxygen initially from the plumbed oxygen source and thereafter from the oxygen bottle, upon operation of the actuator.

30. A method of supplying emergency breathing oxygen for premises evacuation comprising the steps of:
providing a plumbed source of oxygen;
providing a portable oxygen supply device with a compacted hood attached thereto, connecting the portable oxygen supply device to the plumbed source and securing by a tether at a usage location in the premises;

pulling on the portable oxygen supply device until the tether disconnects;

initiating flow of oxygen from the plumbed source to the compacted hood;

uncompacting the hood;

donning of the hood upon the user's head to receive breathable oxygen from the plumbed source while the portable oxygen supply device remains connected to the plumbed source;

operating an actuator on the portable oxygen supply device to selectively switch breathable oxygen supply to the hood from the plumbed source to an auxiliary source of oxygen carried by the hood while simultaneously disconnecting the portable oxygen supply device from the plumbed source of oxygen.

31. The method of claim 30, and further comprising the step of pulling the actuator until the actuator detaches, so as to visually and tactilely indicate that breathable oxygen supply to the hood has been switched from the plumbed source to the auxiliary source.

32. The method of claim 30, further comprising a cam which rotates upon operation of the actuator member, rotation of the cam causing a piercing pin to pierce an oxygen bottle constituting the auxiliary source and simultaneously physically displacing a disconnect system from the portable oxygen supply device.

* * * * *